United States Patent
Pope et al.

(10) Patent No.: US 12,499,073 B2
(45) Date of Patent: Dec. 16, 2025

(54) NETWORK INTERFACE DEVICE

(71) Applicant: XILINX, INC., San Jose, CA (US)

(72) Inventors: Steven Leslie Pope, Cambridge (GB); Derek Edward Roberts, Cambridge (GB); David James Riddoch, Cambridgeshire (GB); Ripduman Singh Sohan, San Jose, CA (US)

(73) Assignee: XILINX, INC., San Jose, CA (US)

(*) Notice: Subject to any disclaimer, the term of this patent is extended or adjusted under 35 U.S.C. 154(b) by 36 days.

(21) Appl. No.: 18/090,222

(22) Filed: Dec. 28, 2022

(65) Prior Publication Data

US 2024/0220440 A1 Jul. 4, 2024

(51) Int. Cl.
*G06F 13/42* (2006.01)
*G06F 9/45* (2006.01)
*G06F 9/455* (2018.01)

(52) U.S. Cl.
CPC .......... *G06F 13/42* (2013.01); *G06F 9/45558* (2013.01); *G06F 2009/45595* (2013.01)

(58) Field of Classification Search
CPC .................. G06F 13/42; G06F 9/45558; G06F 2009/45595
See application file for complete search history.

(56) References Cited

U.S. PATENT DOCUMENTS

| | | | | |
|---|---|---|---|---|
| 7,159,111 B1* | 1/2007 | Ganapathy | ............ | G06F 21/606 709/212 |
| 7,448,044 B1* | 11/2008 | Rust | .................... | H04L 49/3018 709/217 |
| 2002/0141424 A1* | 10/2002 | Gasbarro | .............. | H04L 49/901 370/412 |
| 2004/0049600 A1* | 3/2004 | Boyd | .................... | G06F 12/145 709/212 |
| 2004/0193908 A1* | 9/2004 | Garcia | .................. | G06F 12/145 711/E12.102 |
| 2008/0126509 A1* | 5/2008 | Subramanian | .......... | H04L 47/10 709/214 |
| 2013/0159568 A1* | 6/2013 | Shahar | .................. | H04L 49/901 710/54 |
| 2013/0315237 A1* | 11/2013 | Kagan | ................. | H04L 47/2441 370/389 |
| 2016/0212214 A1* | 7/2016 | Rahman | .............. | H04L 47/6295 |

* cited by examiner

*Primary Examiner* — Henry Tsai
*Assistant Examiner* — Harry Z Wang
(74) *Attorney, Agent, or Firm* — Patterson + Sheridan, LLP (57) ABSTRACT

A network interface device comprises at least one processor configured to validate at least a part of a context associated with a queue pair, the context being fetched from a memory on a host device.

19 Claims, 6 Drawing Sheets

NETWORK INTERFACE DEVICE

TECHNICAL FIELD

This application relates to a network interface device.

BACKGROUND

Network interface devices (e.g., a network interface card/controller (NIC) or SmartNIC) are known and are typically used to provide an interface between a computing device and a network.

SUMMARY

According to an aspect, there is provided a network interface device comprising: at least one processor configured to fetch a context associated with a queue pair from a memory on a host device and validate at least a part of the context associated with the queue pair.

The at least one processor may be configured to validate at least a part of the context by determining if the respective part of the context contains one or more invalid values.

The at least one processor may be configured to replace one or more invalid values in the context with one or more valid values when it is determined that the part of the context contains invalid values.

The at least one processor may be configured to replace one or more invalid values in the context with one or more values associated with a function with which the queue pair is associated.

The function may comprise a virtual machine associated with the queue pair.

The function may comprise an interface associated with the queue pair.

The at least one processor may be configured to use one or more valid values, when it is determined that the part of the context contains one or more invalid values, instead of the invalid values.

The at least one processor may be configured to validate at least a part of the context by determining if one or more values in the context meet one or more criteria.

Determining if one or more values in the context meet one or more criteria may comprise determining if a queue pair is permitted to access a resource referenced in the queue pair context.

Determining if one or more values in the context meet one or more criteria may comprise determining if a resource referenced in the queue pair context is owned by a function which is associated with the queue pair.

The at least one processor may be configured to abort an operation associated with the queue pair context when the one or more criteria are not met.

Determining if one or more values in the context meet one or more criteria may comprise determining if a value of a field of the context is outside an allowed range of values for that field.

The at least one processor may be configured to update the value of the field of the context to a value in the allowed range when it is determined that the value of the field is outside the allowed range of values for that field.

The at least one processor may be configured to use a value in the allowed range when it is determined that the value of the field of the context is outside the allowed range of values for that field instead of the value in the field.

According to an aspect, there is provided a method comprising: fetching a context associated with a queue pair from a memory on a host device, and validating, in a network interface device, at least a part of the context associated with the queue pair.

The method may comprise validating at least a part of the context by determining if the respective part of the context contains one or more invalid values.

The method may comprise replacing one or more invalid values in the context with one or more valid values when it is determined that the part of the context contains invalid values.

The method may comprise replacing one or more invalid values in the context with one or more values associated with a function with which the queue pair is associated.

The function may comprise a virtual machine associated with the queue pair.

The function may comprise an interface associated with the queue pair.

The method may comprise using one or more valid values, when it is determined that the part of the context contains one or more invalid values, instead of the invalid values.

The method may comprise validating at least a part of the context by determining if one or more values in the context meet one or more criteria.

Determining if one or more values in the context meet one or more criteria may comprise determining if a queue pair is permitted to access a resource referenced in the queue pair context.

Determining if one or more values in the context meet one or more criteria may comprise determining if a resource referenced in the queue pair context is owned by a function which is associated with the queue pair.

The method may comprise aborting an operation associated with the queue pair context when the one or more criteria are not met.

Determining if one or more values in the context meet one or more criteria may comprise determining if a value of a field of the context is outside an allowed range of values for that field.

The method may comprise updating the value of the field of the context to a value in the allowed range when it is determined that the value of the field is outside the allowed range of values for that field.

The method may comprise using a value in the allowed range when it is determined that the value of the field of the context is outside the allowed range of values for that field instead of the value in the field.

According to another aspect, there is provided a network interface device comprising: a memory configured to store state for each of a plurality of queue pairs stored on a host device; a pre-scheduler configured to select a subset of the queue pairs in dependence on the stored state; and a scheduler configured to schedule one or more of the queue pairs in the subset of queue pairs.

The state comprises: work outstanding; or no work outstanding.

The state comprises: being scheduled; idle; to be scheduled; or scheduled with further work requests.

The subset may have a maximum number of queue pairs.

The pre-scheduler may be configured to remove a queue pair from the subset when that queue pair has been scheduled by the scheduler.

The memory may be configured to store the state for each of the plurality of queue pairs in a table.

The pre-scheduler may be configured to iterate across the table to determine for a respective entry in the table if the associated queue pair is ready for scheduling and has not yet been scheduled, and to add the associated queue pair to the associated queue pair is ready for scheduling and has not yet been scheduled, According to another aspect, there is provided a method comprising: storing in a memory of a network interface device state for each of a plurality of queue pairs stored on a host device; selecting a subset of the queue pairs in dependence on the stored state; and scheduling one or more of the queue pairs in the subset of queue pairs.

The state comprises: work outstanding; or no work outstanding.

The state comprises: being scheduled; idle; to be scheduled; or scheduled with further work requests.

The subset may have a maximum number of queue pairs.

The method may comprise removing a queue pair from the subset when that queue pair has been scheduled by the scheduler.

The state for each of the plurality of queue pairs may be stored in a table.

The method may comprise iterating across the table to determine for a respective entry in the table if the associated queue pair is ready for scheduling and has not yet been scheduled, and adding the associated queue pair to the associated queue pair is ready for scheduling and has not yet been scheduled, This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF DRAWINGS

Some embodiments are illustrated by way of example only in the accompanying drawings. The drawings, however, should not be construed to be limiting of the arrangements to only the particular implementations shown. Various aspects and advantages will become apparent upon review of the following detailed description and upon reference to the drawings.

DETAILED DESCRIPTION

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

When data is to be transferred between two data processing systems over a data channel, each of the data processing systems has a suitable network interface to allow it to communicate across the channel. The data channel may be provided by a network. For example, the network may be based on Ethernet technology or any other suitable technology. The data processing systems may be provided with network interfaces that are capable of supporting the physical and logical requirements of the network protocol. The physical hardware component of network interfaces are referred to as network interface devices or network interface cards/controllers (NICs). In this document, the network interface device is referred to a NIC. A NIC is not necessarily implemented in card form. A NIC may be provided in any suitable hardware form such as integrated circuit or hardware module. The NIC may be provided as a chiplet or integrated into an integrated circuit providing an additional function.

Some embodiments may support remote direct memory access (RDMA). RDMA is a hardware mechanism through which the NIC of one node can directly transfer data to or from the main memory of a remote node without involving the remote processor (e.g. operating system OS of either node). The data may be transferred between two applications and their virtual address spaces. The two applications may be on separate nodes.

Figure 1:
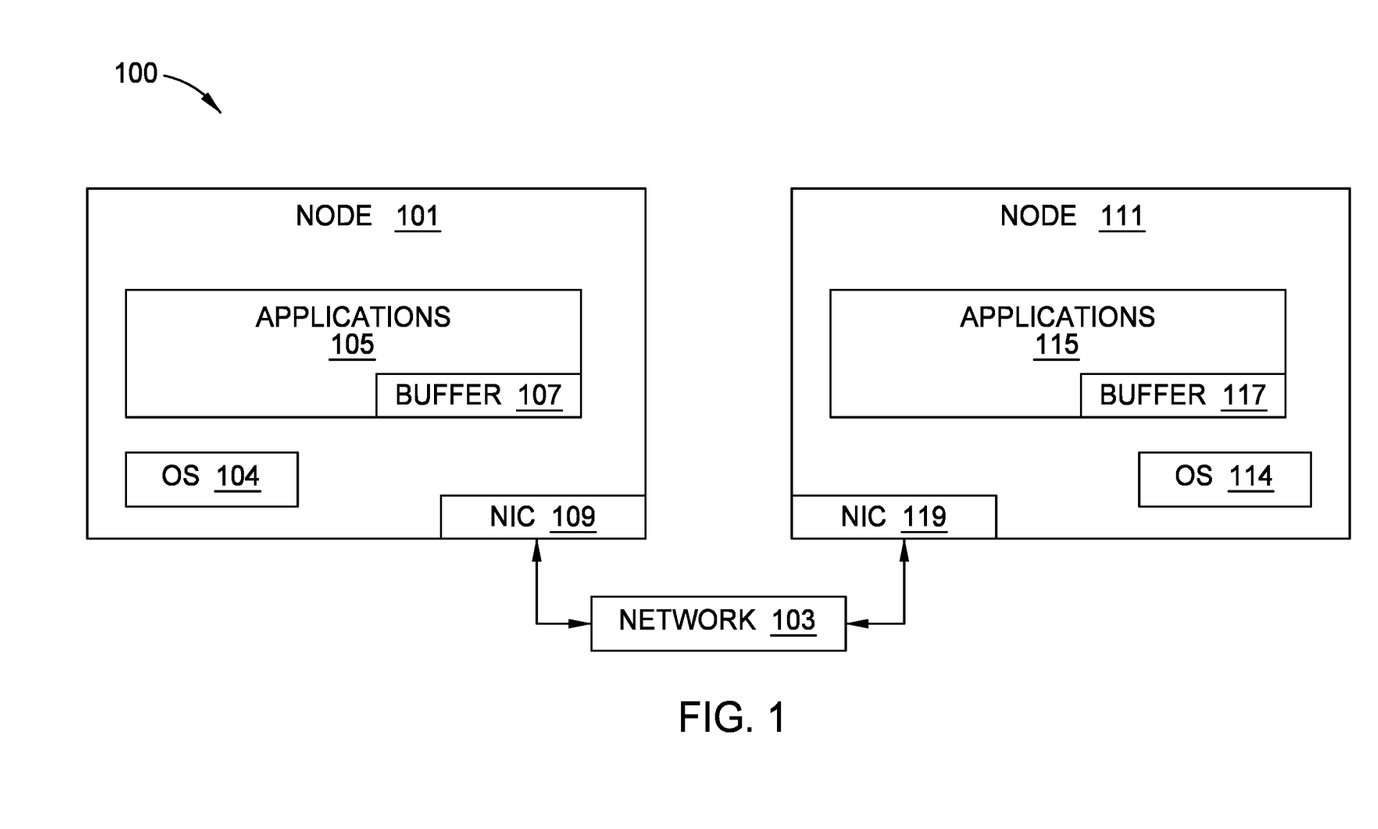
FIG. 1 schematically shows a data processing system for carrying out transmission across a network using RDMA.

An example data processing system 100 for carrying out transmission across a network 103 is shown in FIG. 1, and uses RDMA. The data processing system 100 comprises a first node 101, such as a host computing device, coupled to a NIC 109 that is arranged to interface the host computing device (i.e., the first node 101) to the network 103. The first node 101 includes an operating system OS 104. The first node has one or more user level applications 105. The or each user level application may have a virtual address space or buffer 107. The virtual address space may be part of the host memory of the first node.

In some embodiments, the first node 101 and the NIC 109 may communicate via a bus, for example a peripheral component interconnect express (PCIe bus) or any other suitable bus.

During operation of the data processing system, data to be transmitted onto the network may be transferred from first node 101 to the NIC 109 for transmission to a second node 111 or received from the second node 111.

The data processing system 100 comprises the second node 111, such as a host computing device, coupled to a NIC 119 that is arranged to interface the second node 111 to network 103. The second node 111 includes an operating system 114. The second node has one or more user level applications 115. The user level application or each user level application may have a virtual address space or buffer 117. The virtual address space may be part of the host memory of the second node.

The nodes may be any kind of computing device, for example a server, personal computer, or handheld device.

Some embodiments may be suitable for use in networks that use a protocol supporting RDMA. Embodiments may be used with any suitable networks, wired or wireless.

The data which is received from the network and/or which is to be transmitted by the network may be stored in one or more memories or buffers such as previously discussed.

Computer nodes are provided with an operating system (OS). When using an RDMA capable NIC, the OS is not involved in the transfer of data between the nodes.

Figure 2:
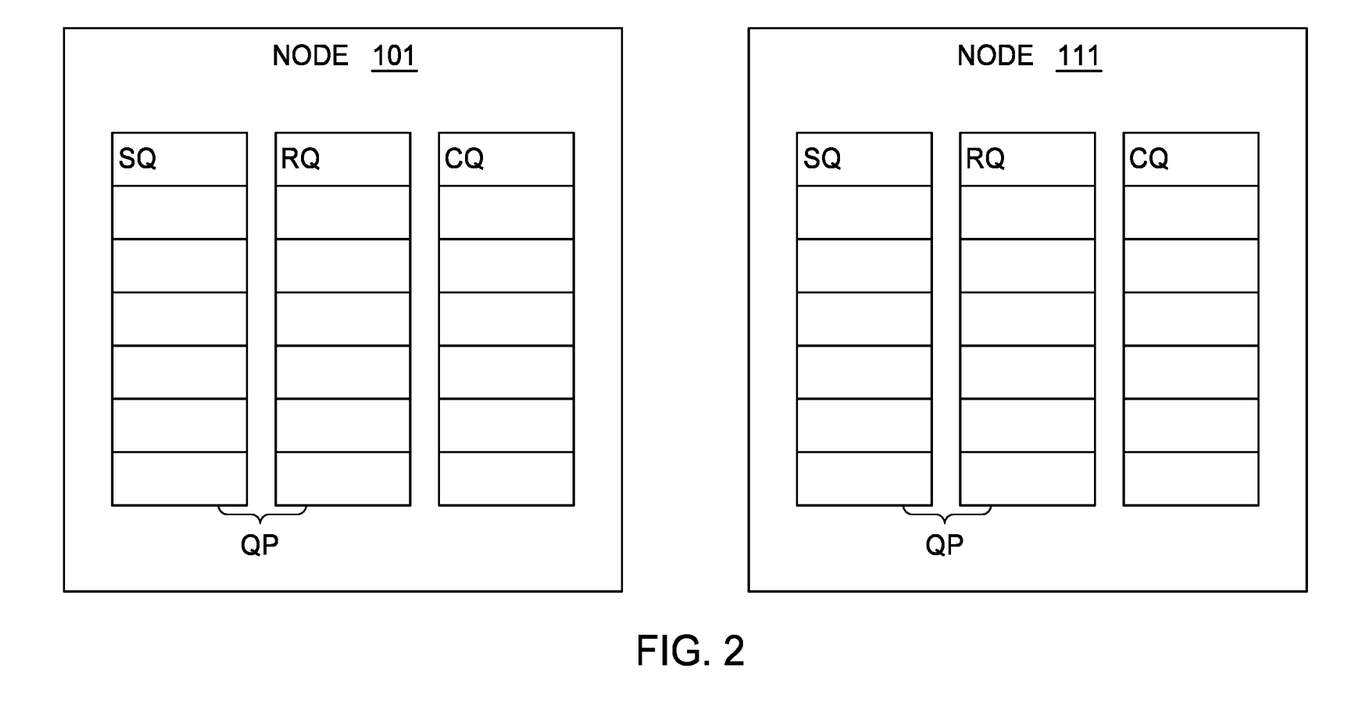
FIG. 2 schematically shows a set of RDMA queues in a first node and a set of RDMA queues in a second node of the data processing system.

Reference is made to FIG. 2. In some embodiments, RDMA communication may be based on three queues: a send queue (SQ), a receive queue (RQ); and a completion queue (CQ). The SQ and the RQ are work queues and are provided as a queue pair (QP). The SQ and RQ are used to schedule the work to be done. When the work is done, a completion queue is notified. FIG. 2 schematically shows a set of queues (SQ, RQ, CQ) in the first node 101 and a set of queues (SQ, RQ, CQ) in the second node 111.

The application on a node may issue a work request.

The work request has a pointer to a buffer.

A work request in a SQ may contain pointers to both source and destination buffers.

In one embodiment, RQ work requests only contain pointers to local (that is on the same node) receive buffers. They are used to deliver data that was sent using a SEND operation.

In one embodiment, SQs are used to submit requests such as: SEND, RDMA WRITE and RDMA READ.

In one embodiment, for SEND: the work request includes pointers to a local buffer containing data to be SENT. (This data may then be delivered to a buffer identified by the RQ work request).

In one embodiment, for RDMA WRITE: the work request has pointers to local source buffer and remote destination buffer.

In one embodiment, for RDMA READ: the work request has pointers to remote source buffer and local destination buffer.

In one embodiment, when the work request has been completed, a completion queue element is placed in the completion queue.

If the first node has a request for a SEND operation in the send queue, there will be a corresponding request in the receive node of the other node. When the request has been completed, the completion queue on both nodes will have a respective completion queue element. In one embodiment, for RDMA WRITE and RDMA READ receive queues are not involved, and there is no corresponding request in the other node.

Figure 3:
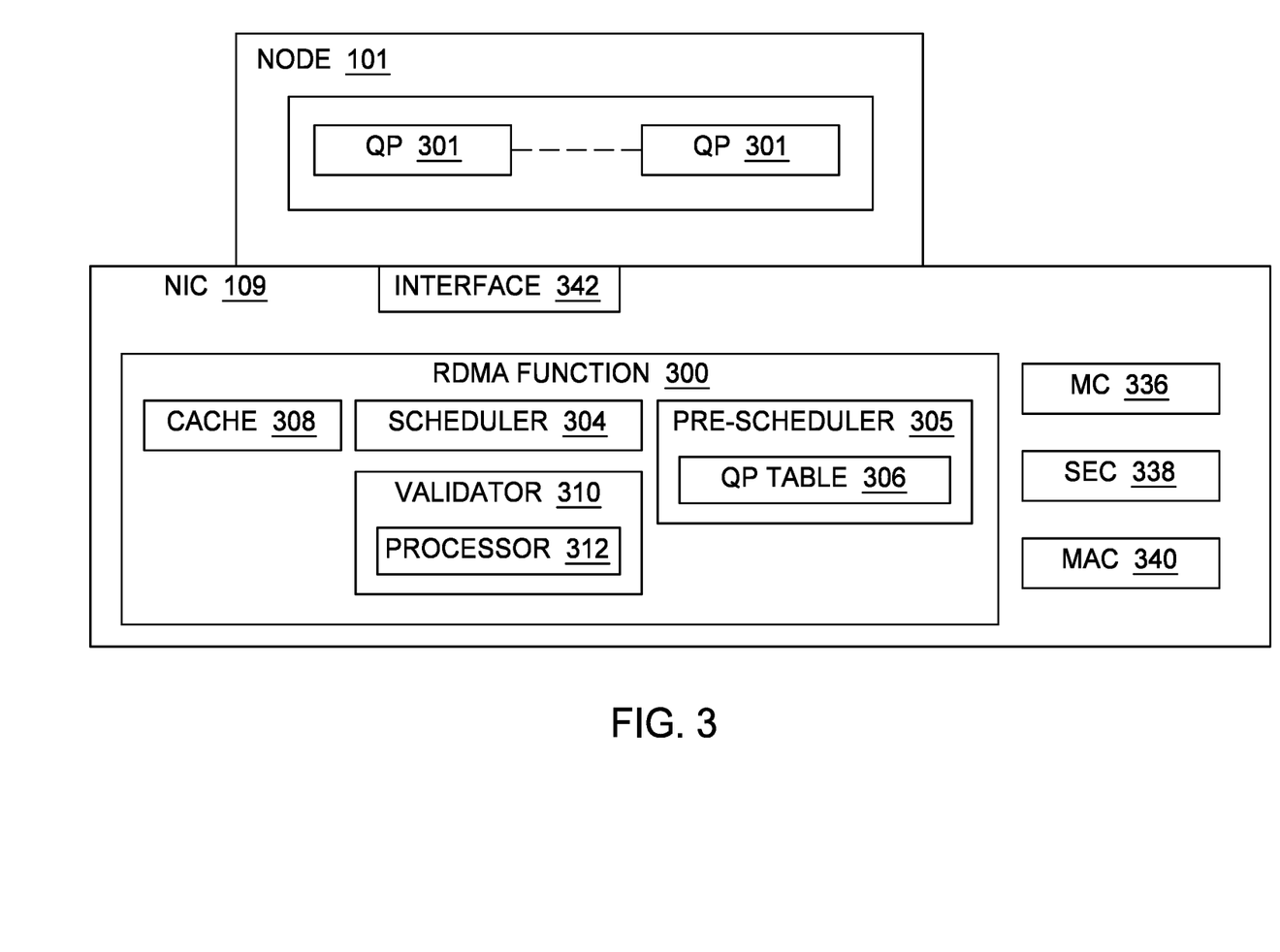
FIG. 3 schematically shows in more detail the first node and an associated NIC.

Reference is made to FIG. 3 which schematically shows the first node 101 of FIG. 1 and its NIC 109. The NIC 109 will be provided with one or more interfaces 342 to the node 101 and a RDMA function 300. The second node may have a similar architecture.

In some embodiments, each NIC supports a plurality of PCIe functions. Each PCIe function is accessed by a single VM (Virtual Machine) or by the host OS if a VM is not being used. Each PCIe function may support a plurally of VIs (Virtual Interface). In one embodiment, each VI is accessed by a single application. Each application may have a plurality of QPs. In practice each application may have a relatively large number of QPs.

Each PCIe function has a QP table 301 in system memory on the host. The QP table may be in memory which is owned by a device driver in the OS of the host. Thus the QPs are stored in tables 301 on the host or node, that is not on the NIC. In FIG. 3, n QP tables 301 are schematically shown. Each QP table may be associated with a respective PCIe function The memory for QP tables is allocated by a RDMA driver. (Referenced 606 in FIG. 6).

In some embodiments, QP table memory is not accessible by applications.

QP tables are read and written by a MC management controller 336 provided on the NIC.

In some embodiments, a node will have a relatively large number of queue pairs. This is to support scaling to relatively large clusters of processing nodes. By way of example only, the number of queue pairs may be of the order of 250K. It should be appreciated that in other embodiments, there may be more than 250K queue pairs or less than 250K queue pairs.

Applications may have relatively small number of VIs mapped into their VA (virtual address) space. Every VI can address up to x send and x receive queues. By way of example only, x may be 64 k. In other embodiments, the maximum may be more or less than 64 k.

Queue pairs QP are an RDMA resource. QP configuration and state is stored in the per-function QP tables 301 in system memory and cached by a cache 308 on NIC. The cache may be part of the RDMA function 300. This arrangement allows a very large number of QPs to be supported with limited storage on the NIC. The cache 308 stores queue pair information including the associated context for QPs which have been fetched from the QP tables 301 in the host memory.

A small amount of state data is stored on the NIC for every QP. For every QP, the state data which is stored on the NIC may indicate if there is one or more outstanding work requests in the QP. This may be stored in a QP table 306 on the NIC or in any other suitable data structure. The QP table may be part of the RMDA function. The NIC may have a doorbell register which is used to notify the NIC of new elements in the send and receive queues. The NIC has a mapping between a doorbell register and the QPs that can be accessed through it—e.g., the QPs that belong to the VI that the doorbell is part of. The NIC may be able to convert between the VI window and the absolute queue IDs.

The QPs are stored in the host in memory that is owned by the VM, that is memory which is owned by the OS kernel that is running the VM. It is not possible for that memory to be accessed by the applications. It is possible for the operating system of the virtual machine to make arbitrary changes to that memory and so the NIC needs to be protected from any changes, malicious or otherwise that could cause problems. It should be noted that the NIC may be used by multiple different VMs which should be isolated from one another so that each VM operates correctly. Thus the host software might access the QPs stored in host memory and might potentially modify any field within the QP context.

In some embodiments a validator 310 is provided to validate the QP context on the NIC. The validator may be implemented by circuitry such as a processor 312. The validator may be part of the RDMA function. The validation will be done for security reasons. The validator 310 may be provided between data path logic and the cache 308. The validation may be done at the point that that referenced resource is required and/or when the QP context is retrieved from the host memory. In other words, the validation may be done when the QP context is retrieved from the cache and/or before the QP context is stored in the cache. The validator 310 may therefore be upstream of the cache and/or downstream of the cache.

In some embodiments, different parts of a QP context may need to be validated. For example, one or more parts of the QP context may be validated before the QP context is stored in the cache and one or more parts of the QP context may be validated when the QP context is retrieved from the cache. In this case, the validator may be provided by a plurality of validation functions.

One or more different validations may be performed by the validator 310. This may be to counter any lack of trust as to what is in the QP tables stored in the host memory.

The validation may be to replace one or more values of the QP context. This may replace one or more parts or values of the QP context with values that are known by the validator to be good or correct. The relevant field or fields of the QP context may be overwritten by the required or correct value.

In some embodiments the validation may be to identify one or more values in the context which are invalid and use a valid value when the field is used. In this case the invalid value in the context valid is not updated in the stored context. Instead when the field having the invalid value is required, a valid value is used instead of that invalid value.

Some examples are given below where an invalid value in the context is replaced with a valid value. It should be appreciated, that in alternative embodiments, the context may not be updated and the valid value used when required.

The QP state may contain a function ID which identifies the function that the QP is associated with. The field containing the function ID can be overwritten with a known value for the function. This is because whenever a QP is fetched from the table on the host, it is necessarily known which function the QP is associated with because the read request for that QP is made through the function.

For example, one or more values of the QP context may be replaced with one or more values associated with an interface (PCIe function) associated with the QP.

For example, one or more values of the QP context may be replaced with one or more values associated with the software domain (VM) associated with the QP.

The QP identity field may be overwritten with a correct value if needed. The QP identity will be known as the QP cannot be fetched without knowing the QP ID. If the QP ID field is not correct, this field can be overwritten with the correct QP ID value.

The validation may be to check that the QP context meets one or more criteria. If the QP context does not meet the criteria, one or more actions may be taken. For example, the operation associated with the QP context may be aborted. In another example, the validation may cause the NIC to behave in a way as if the field did meet the criteria.

For example, the validation may be to check that the QP is not using more resources than it is allowed to use.

If the value in a field is outside the legal range for the field, for example the value is too large or too high, the value may be replaced with a value that does meet the criteria or the value may be treated as if does meet the criteria. The value may be replaced with a value which is within the legal range.

For example, the validation may be to check that a QP is permitted to access a resource referenced by a QP context.

For example, the validation may be to check that a resource referenced by a QP context is owned by the interface (or software domain) that owns the QP.

In some embodiments, a QP context may reference resources in other tables. A QP context may have a pointer. For example, the pointer may be to an event queue table entry or a receive queue table entry. Those pointers may be validated. For example, a check may be made that the queue pair that the pointer is coming from is owned by the same function as the event queue which it is referencing. The event queue is referenced as an event is to be delivered to that event queue and the associated application. In some embodiments, the validation would mean that the event is not delivered to the event queue where the event queue is not owned by the same function.

Where the validation operation results in the aborting of the operation, this may raise an error or may be silent—that is the operation is just not performed.

As the QPs are stored on the node 101, the NIC needs to be able to keep track of which QPs have work outstanding. As discussed previously, the table 306 or other data structure is stored on the NIC. This data structure is stored in memory on the NIC. In this regard, reference is made to FIG. 4 which schematically shows an example of the table 306. The table has an entry for each QP.

Figure 4:
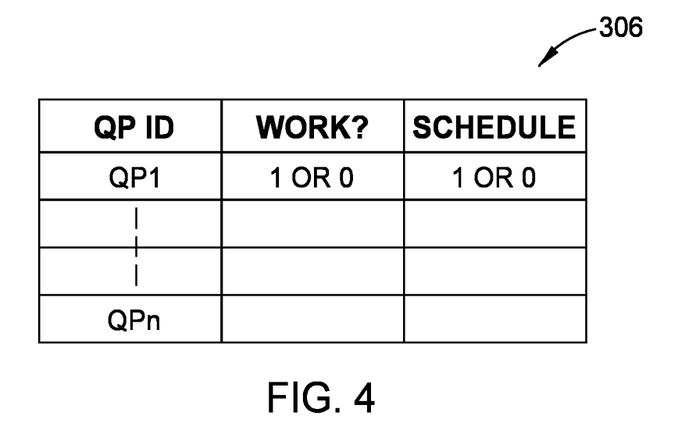
FIG. 4 shows an example of a table stored on the NIC with QP state data.

In the example, shown in FIG. 4, for each queue pair a bit is stored. The bit has two states. If the bit is one state, this means that the respective QP has work outstanding. If the bit is in the other state, this means that the respective QP does not have work outstanding. One option may be stored the bit in association with the QP ID. In other embodiments, the table may be indexed by the QP ID. This can be implemented where the QP ID is linear. In some embodiments an indirection table maps groups of QP IDs into a linear table that is table 306. This latter option has the advantage of requiring less storage.

In some embodiments, an additional per-QP state might be maintained on the NIC. For example, two bits may be stored for each QP giving up to four different states.

In some embodiments the state may be one of the following states:

Being scheduled;
Idle—all work completed for the QP (or none requested):
To be scheduled. A work request for this QP has been received, and is awaiting scheduling;
Scheduled and there is more work: the requested work for this QP is currently scheduled and a further work requests for this QP has been received.

The state may be provided by a pair of values.

One or more of these states may be omitted.

The table on the host is kept updated by the NIC. The NIC will update the table when the NIC has completed a respective WR.

When the status of the queue pair on the host changes from having no WR outstanding to having one or more WRs outstanding, the host will cause an update to be sent to the NIC. The NIC will then update the table.

This table can be checked and then one or more WRs for a QP with outstanding work can be fetched from the host as required. This is useful in different situations.

For example, this can be useful in the receive path where the processing of receive data is decoupled from the sending of acknowledgement packets to the peer node that initiated the request.

This can be used to manage doorbells if they are received at a faster rate than they can be serviced.

In some embodiments, the WRs can be fetched when the WR has been scheduled by a scheduler 304 of the RDMA, as shown in FIG. 3. In some embodiments, the WRs can be fetched when the QP has been put into an active set for scheduling by the scheduler. In other embodiments, the WRs can be fetched in advance to ensure that WRs are always available to be serviced.

The scheduler may work with an active subset of QPs when scheduling which is provided by a pre-scheduler 305 which may be part of the RDMA function. For example, there may be a limit on the number of active QPs in the active subset. By way of example, there may be of the order of 2K active QPs in the active subset. In other embodiments, the limit on the number of QPs in in the active subset used by the scheduler may be more or less than 2K active QPs.

In some embodiments, when a QP has been served or is no longer ready to be scheduled or has been sufficiently served, that QP is removed from the active subset and a new QP that is ready to be served is added to the active subset.

The pre-scheduler 305 may be configured to iterate across the entries in the table 306, inspecting each entry in turn to determine if the associated QP is ready for scheduling and not yet scheduled. If there is space in the active subset, the associated QP is added to the active subset for scheduling by the scheduler 304. In some embodiments, the pre-scheduler 305 may be configured to provide a degree of fairness between different functions so the pre-scheduler may limit the number of QPs from each function that can be in the scheduled set.

A QP may be moved out of the active set by the pre-scheduler when it has done a given amount of work. This may only be done if there are QPs which are waiting to join the active set. In other words, a QP which has been scheduled and has been served to a certain extent may be removed out of the active subset even if the QP still has work to be scheduled. This is to avoid the hogging of resources by a particular QP. When a QP is removed from the active subset, the active subset table is updated to remove that QP. Of course, if the number of QPs that have work to do is less the maximum number of QPs in the active set, they are all in the active set.

Figure 5:
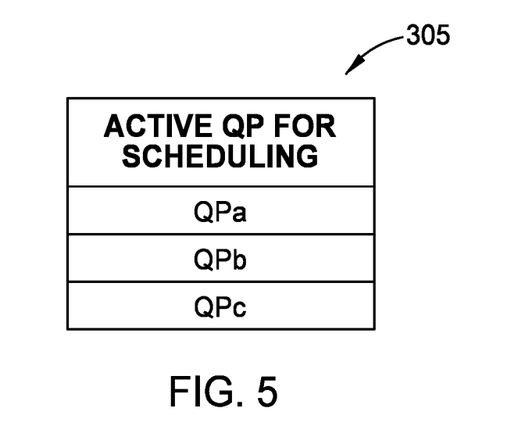
FIG. 5 schematically shows a set of QPs for scheduling by a scheduler of the NIC.

In some embodiments, a separate data structure, such as shown in FIG. 5 may be provided. This data structure will store information identifying a QP (e.g. QPa, QPb, QPc etc) which is in the active subset of QPs for scheduling. This may be provided as part of the pre-scheduler.

Alternatively or additionally, the table shown in FIG. 4 may have an additional bit or flag as to whether the QP is in the active set for scheduling. In some embodiments, the QP has an indicator indicating that QP has one or more outstanding WRs. For example, if a bit is in one state, the QP is in the active set for scheduling. If the bit is the other state, the QP is not in the active set of scheduling. In some embodiments, if the indicator for the QP indicates that there are one or more outstanding WRs, then that may be used to also put the QP into the active scheduling subset. This would avoid the need for the data structure of FIG. 5.

The QP scheduler 304 operates on a subset of the QPs provided by the pre-scheduler 305. The QP scheduler is configured to respect flow control rules. This is to ensure that head of line blocking between different priority channels is avoided. The priority channels may be related to Ethernet priority channels. The QP scheduler is configured to control the sharing of resources. This requires that some state is stored on a per QP basis on the NIC. This can avoid an overhead which would otherwise result if the scheduler iterated over the QPs in host memory. Having state stored for all QPs on the NIC would require a relatively large amount of memory of the NIC. Thus, the pre-scheduler provides a subset of QPs for the QP scheduler and only the state of those subset of QPs needs to be stored on the NIC.

The pre-scheduler will determine which QPs are in the current subset.

The pre-scheduler block 305 manages up to n QPs, and from these maintain an active scheduled set of m QPs. n is the total number of QPs the system is specified to handle. m is the expected number of QP sources the QP-Scheduler will be able to concurrently schedule. n is very much larger than m in some embodiments. By way of example only, n may be 256 Ki and m may be 2 Ki.

The pre-scheduler accepts work requests from the doorbell and response handler block against a QP. These work requests may only indicate to the pre-scheduler that a particular QP has work to do. It may not indicate the type or how much.

A scanning function in the pre-scheduler may continually scan the QP table 306 for all QPs looking for QPs in the waiting for scheduling state. Upon finding a suitable QP, it will add it to the working scheduled subset of QPs. It will then signal the QP along with a Source ID to the scheduler 304 to have it actively scheduled.

The QP scheduler will return all job response message for scheduled QPs back to the pre-scheduler 305. These responses will indicate the current state of the QP. These responses may be one of:
  all the work has been completed for that QP;
  there is more work to do, but the maximum amount of work was performed in the current scheduling round;
  the QP is still actively scheduled in QP-Scheduler.
  These can be used to update the QP state table.

Referring back to FIG. 3, the NIC 109 is provided with an interface 342 which is an interface to the node 101. This interface 342 represents a plurality of PCIe functions of the NIC.

Figure 6:
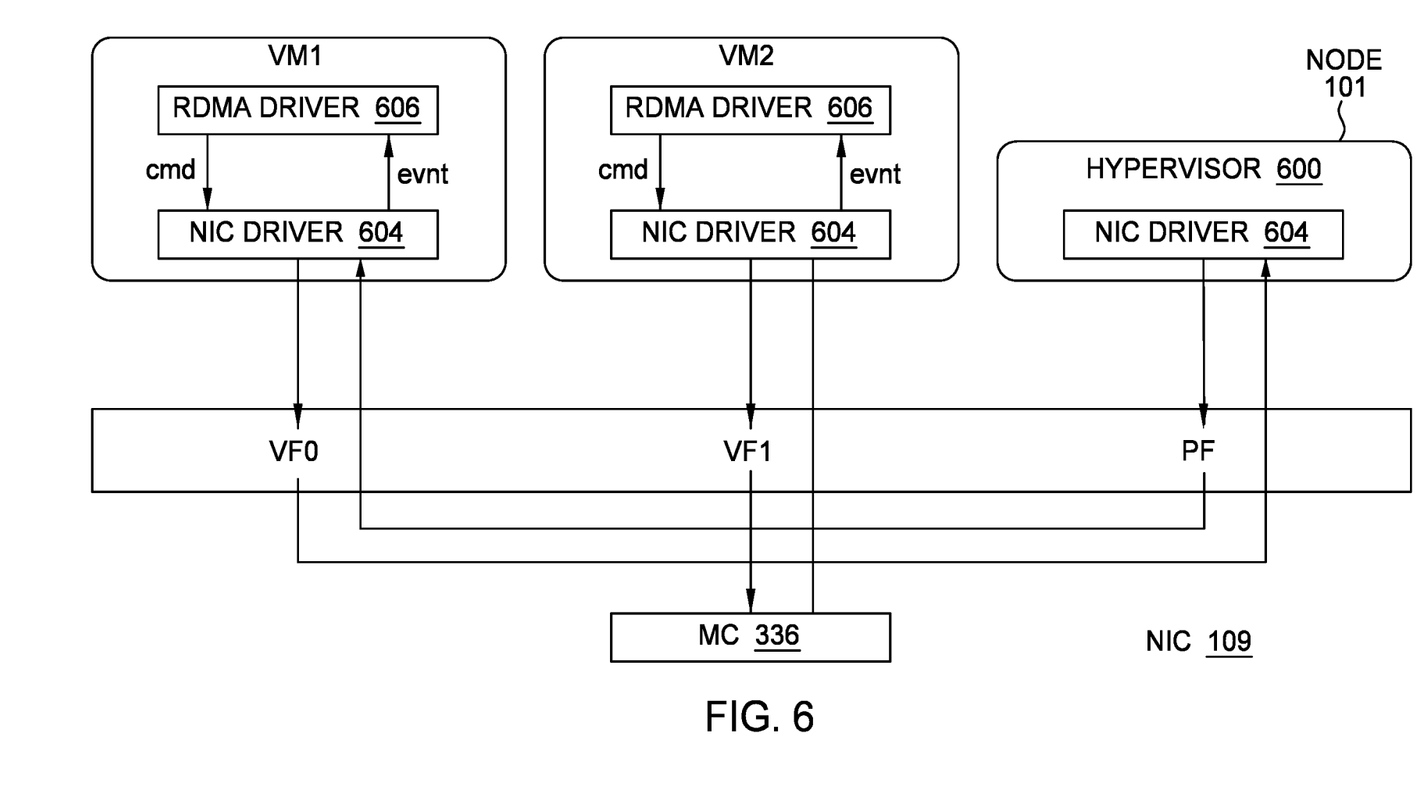
FIG. 6 schematically shows a VM architecture of some embodiments.

Thus a queue pair is associated with particular virtual interfaces VI. A virtual interface may be associated with a particular interface, such as a PCIe interface. In this regard, reference is made to FIG. 6 which schematically shows a first virtual machine VM1 and a second virtual machine VM2. FIG. 6 schematically illustrates the interaction of software components. In some embodiments, more or less than two VMs may be provided. A hypervisor 600 is also provided. The hypervisor 600 is a virtual machine monitor which creates and runs the VMs. The hypervisor 600, the first VM1 and the second VM2 are provided on the host/node device 101. The hypervisor 600, the first VM1 and the second VM2 each have a NIC driver 604. The first VM1 and the second VM2 each have a RDMA driver 606.

The NIC 109 is provided with a management controller. The management controller 336 may manage one or more of the RDMA function 300, the security function 338 (see FIG. 3) and the MAC function 340 (see FIG. 3) of the NIC. In some embodiments, one or more of the RDMA function 300, the security function and the MAC function 340 may be provided by hardware blocks. The management controller 336 manages the initialization, configuration and/or de-initialization of these hardware blocks. The management controller 336 maintains per-PCIe-function data structures.

In some embodiments, each VM will "see" an independent NIC. A host interface 610 for each VF is made available via PCIe BARs (peripheral component interconnect express base address registers) or the like for that VF. The host drivers (the RDMA driver 606 and/or the NIC driver 604) on each VM communicates with the management controller 336 over the host interface 610.

The following is an example a flow of a read. The read may be an RDMA read.

First, a work request WR is constructed by an application on a first node constructs an RDMA (read) WR and places it on a send queue SQ in the first node. The work request will be a pointer to a message to be sent. A READ work request contains a pointer to the data to be fetched from the remote node. It also contains a pointer to the local buffer into which the fetched data should be copied.

For each buffer (local or remote) the work request includes a memory key and a pointer. The memory key identifies a memory region (MR) which is used to validate and translate the pointer.

The WR may comprise one or more of the following fields:
- identity—used to identify the request. Requests may be consumed in-order and every request may have an associated completion.
- scatter-gather number—indicates the number of scatter-gather elements following the structure.
- remote address—the remote VA (virtual address) space to read from.
- remote key—the remote VA's access control key to authenticate the request.

The WR may be followed by one or more scatter-gather elements each of which has:
- local address—pointer to an application-local VA contained in a registered memory region MR.
- length—Maximum length of element.
- key—MR local access key.

Once the WR has been constructed, the application rings the doorbell of the SQ through an VI window. The NIC receives doorbells via the interface.

On receiving the doorbell, the NIC schedules a fetch of the WR, received through the interface On receipt of the WR, the NIC begins the process of constructing an outbound read RD request. First step, the outbound QP's context state is retrieved. The NIC first does a lookup for the QP context state in its local NIC cache. If this lookup misses, a request to load the context is submitted to system memory of the host through the interface.

The NIC uses information from the QP context state and the WR to construct a wire-format read request.

Fields in this request may include a PSN (packet sequence number), a destination QP (obtained from the QP context state), a remote key and a VA (obtained from WR).

The NIC may maintains a reference to or a copy of the WR's SGEs (scattered gather element) for the purposes of local data delivery on receipt of the request's response.

The MAC function 340 queues the packet in an outbound FIFO mapped to the packet's PFC and forwards it to a PCS (physical coding sublayer) block for transmission over the wire.

Work completions (WCs) are generated when local WRs are completed or a remote requester does a send or write to a local QP.

A transmit flow of some embodiments is now described.

A WR is constructed by a host driver in memory allocated to the SQ ring buffer.

The driver rings the SQ doorbell through the appropriate VI. Doorbells are routed to NIC via the interface.

The scheduler 304 constantly receives destination credit messages announcing the availability of destination egress buffering. When there is suitable credit in the destination TX priority channel, the scheduler schedules a job for one or more QPs contained in the TX priority channel.

The QP state is fetched. On a per-QP basis, the NIC processes the SQ doorbell. The NIC does a lookup for QP state in the on-chip QP cache 308. If the QP state is not in the cache, the NIC issues a request to load QP State from the host via the interface.

Once the QP State has been retrieved, the WQE (work queue entry) is fetched from the host and decoded.

The NIC uses information from the QP State and the WQE to construct a wire-format packet. To construct this request, it may need to access system memory (e.g. for RDMA Writes).

The NIC will do a DMA of the data from system memory as part of RDMA packet creation.

The NIC will forward the data to the security function 338.

In some embodiments, the mapping of TX traffic to traffic streams may use the active set of candidate QPs for scheduling as described previously may be as follows:

Each QP or TxQ is associated with a single transmit priority. The priority may for example correspond to 1 of the 8 PCPs (Priority Code Points defined in the IEEE 802.1 Qbb standard). Different QPs/TxQs may be assigned to different transmit priorities.

All the transmit priorities are mapped to one of a plurality of different TX priority channels. By way of example only, there may be 4 RDMA TX priority channels. However, in other embodiments, n may be less than 4 or more than 4. Two or more different PCPs may be mapped to the same TX priority channel.

Figure 7:
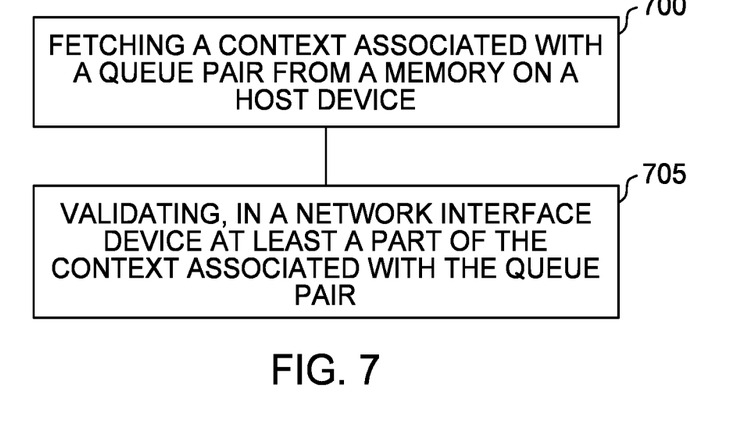
FIG. 7 shows a first method of some embodiments.

Reference is made to FIG. 7 which shows a first method of some embodiments. The method may be performed by a NIC. In some embodiments, the method may be implemented by computer software executable by a data processor, such as in a processor, or by hardware, or by a combination of software and hardware.

The method may comprise, as referenced 700, fetching a context associated with a queue pair from a memory on a host device. At block 705, validating, in a network interface device, at least a part of the context associated with the queue pair.

Figure 8:
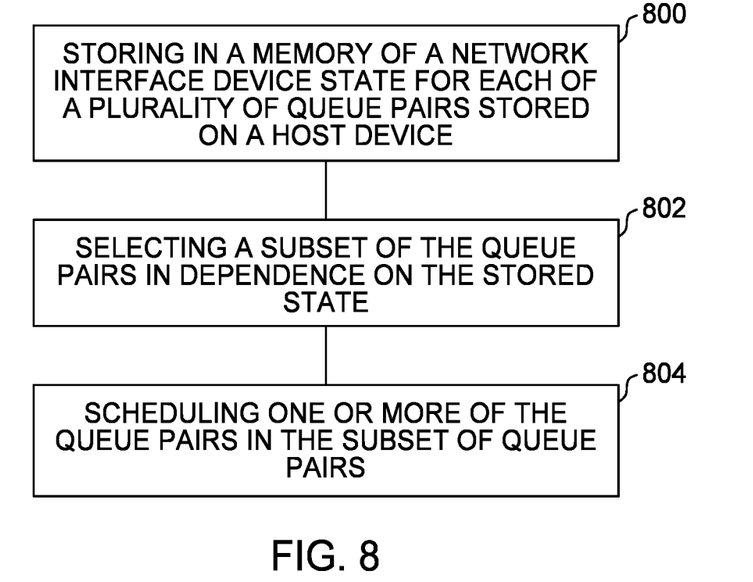
FIG. 8 shows a second method of some embodiments.

Reference is made to FIG. 8, which shows a second method of some embodiments. The method may be performed by a NIC. In some embodiments, the method may be implemented by computer software executable by a data processor, such as in a processor, or by hardware, or by a combination of software and hardware.

The method may comprise, as referenced 800, storing in a memory of a network interface device state for each of a plurality of queue pairs stored on a host device.

The method may comprise, as referenced 802, selecting a subset of the queue pairs in dependence on the stored state.

The method may comprise, as referenced 804, scheduling one or more of the queue pairs in the subset of queue pairs.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

The invention claimed is:

1. A network interface device comprising:
   at least one processor configured to:
   fetch a context associated with a queue pair from a memory on a host device; and validate at least a part of the context associated with the queue pair based on confirming a value of a field of the context is outside an allowed range of values for that field and one of:
  update the value of the field of the context to a value in the allowed range based on confirming that the value of the field is outside the allowed range of values for that field; or
  use a value in the allowed range based on confirming that the value of the field of the context is outside the allowed range of values for that field instead of the value in the field.

2. The network interface device as claimed in claim 1, wherein the at least one processor is configured to validate at least a part of the context by determining if the respective part of the context contains one or more invalid values.

3. The network interface device as claimed in claim 2, wherein the at least one processor is configured to replace one or more invalid values in the context with one or more valid values when it is determined that the part of the context contains invalid values.

4. The network interface device as claimed in claim 3, wherein the at least one processor is configured to replace one or more invalid values in the context with one or more values associated with a function with which the queue pair is associated.

5. The network interface device as claimed in claim 4, wherein the function comprises a virtual machine associated with the queue pair.

6. The network interface device as claimed in claim 4, wherein the function comprises an interface associated with the queue pair.

7. The network interface device as claimed in claim 2, wherein the at least one processor is configured use one or more valid values, when it is determined that the part of the context contains one or more invalid values, instead of the invalid values.

8. The network interface device as claimed in claim 1, wherein the at least one processor is configured to validate at least a part of the context by determining if one or more values in the context meet one or more criteria.

9. The network interface device as claimed in claim 8, wherein determining if one or more values in the context meet one or more criteria comprises determining if a queue pair is permitted to access a resource referenced in the queue pair context.

10. The network interface device as claimed in claim 8, wherein determining if one or more values in the context meet one or more criteria comprises determining if a resource referenced in the queue pair context is owned by a function which is associated with the queue pair.

11. The network interface device as claimed in claim 8, wherein the at least one processor is configured to abort an operation associated with the queue pair context when the one or more criteria are not met.

12. The network interface device as claimed in claim 8, wherein determining if one or more values in the context meet one or more criteria comprises determining if a value of a field of the context is outside an allowed range of values for that field.

13. A method comprising:
  fetching a context associated with a queue pair from a memory on a host device; and
  validating at least a part of the context associated with the queue pair based on confirming a value of a field of the context is outside an allowed range of values for that field and one of:
    updating the value of the field of the context to a value in the allowed range based on confirming that the value of the field is outside the allowed range of values for that field; or
    using a value in the allowed range based on confirming that the value of the field of the context is outside the allowed range of values for that field instead of the value in the field.

14. The method as claimed in claim 13, comprising validating at least a part of the context by determining if the respective part of the context contains one or more invalid values.

15. The method as claimed in claim 14, comprising replacing one or more invalid values in the context with one or more valid values when it is determined that the part of the context contains invalid values.

16. The method as claimed in claim 13, comprising validating at least a part of the context by determining if one or more values in the context meet one or more criteria.

17. The method as claimed in claim 16, wherein determining if one or more values in the context meet one or more criteria comprises determining if a value of a field of the context is outside an allowed range of values for that field.

18. The network interface device as claimed in claim 1, wherein the validating is based on confirming that a given resource referenced by the context is owned by an interface that owns the queue pair.

19. The network interface device as claimed in claim 1, wherein the context comprises a pointer to an event queue, wherein the validating is based on confirming that the queue pair and the event queue are owned by a common function.

\* \* \* \* \*